United States Patent
Rutkiewicz et al.

(10) Patent No.: US 11,181,368 B2
(45) Date of Patent: Nov. 23, 2021

(54) VISIBILITY RANGE SENSING

(71) Applicant: Simmonds Precision Products, Inc., Vergennes, VT (US)

(72) Inventors: Robert Rutkiewicz, Edina, MN (US); David Matty, Rosemount, MN (US); Kent Allan Ramthun, Shakopee, MN (US); Joseph T. Pesik, Eagan, MN (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 604 days.

(21) Appl. No.: 16/105,701

(22) Filed: Aug. 20, 2018

(65) Prior Publication Data
US 2020/0056885 A1  Feb. 20, 2020

(51) Int. Cl.
| | |
|---|---|
| *G01C 11/14* | (2006.01) |
| *G06T 7/194* | (2017.01) |
| *G01S 17/89* | (2020.01) |
| *G01S 17/933* | (2020.01) |
| *G01S 17/95* | (2006.01) |
| *G08G 5/00* | (2006.01) |
| *G08G 5/06* | (2006.01) |

(52) U.S. Cl.
CPC .............. *G01C 11/14* (2013.01); *G01S 17/89* (2013.01); *G01S 17/933* (2013.01); *G01S 17/95* (2013.01); *G06T 7/194* (2017.01); *G08G 5/0086* (2013.01); *G08G 5/065* (2013.01); *G06T 2207/10028* (2013.01); *G06T 2207/20224* (2013.01)

(58) Field of Classification Search
CPC .......... G06T 7/50; G06T 7/521; G06T 7/194; G06T 2207/10028; G06T 2207/20224; G01S 17/933; G01S 17/46; G01S 17/89; G01S 17/95; G06K 9/2036; G06K 9/2018; G06K 9/00805; G08G 5/0021; G08G 5/065; G08G 5/045; G08G 5/0086; B64D 47/02; B64D 47/08; G01C 11/14
See application file for complete search history.

(56) References Cited

U.S. PATENT DOCUMENTS

| | | |
|---|---|---|
| 9,858,682 B2 | 1/2018 | Heidemann et al. |
| 9,911,344 B2 | 3/2018 | Kabrt et al. |
| (Continued) | | |

OTHER PUBLICATIONS

Extended European Search Report dated Nov. 29, 2019, received for corresponding European Application No. 19191967.9, 7 pages.

*Primary Examiner* — Luke D Ratcliffe
(74) *Attorney, Agent, or Firm* — Kinney & Lange, P.A.

(57) ABSTRACT

A system includes at least one light projector, at least one image sensor, and at least one controller. The at least one light projector is attachable to an aircraft at a first location. The at least one light projector is configured to emit a first beam of light in a first direction at a first intensity. The at least one image sensor is attachable to the aircraft at a second location. The at least one image sensor is configured to capture a first image of a scene including reflections of the first beam of light and a second image of the scene without the at least one projector emitting a beam of light. The at least one controller is configured to determine a maximum detection range of the first beam of light based upon the light intensity of the light beam, the first location, and the second location.

18 Claims, 6 Drawing Sheets

(56) References Cited

U.S. PATENT DOCUMENTS

| | | |
|---|---|---|
| 2017/0011268 A1 | 1/2017 | Yamaguchi |
| 2017/0142312 A1 | 5/2017 | Dal Mutto et al. |
| 2017/0301250 A1* | 10/2017 | Ell .......................... G06T 7/50 |
| 2017/0374352 A1 | 12/2017 | Horesh |
| 2018/0096610 A1 | 4/2018 | Ray et al. |
| 2018/0356819 A1* | 12/2018 | Mahabadi ............. B60W 30/09 |

\* cited by examiner

VISIBILITY RANGE SENSING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircraft often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin. Some commercial and some military aircraft have engines that extend below the wings. Pilots, positioned in the cabin, can have difficulty knowing the risk of collisions between the wingtips and/or engines and other objects external to the aircraft. Visibility is further hindered by fog, rain, or snow. An aircraft on-ground collision alerting system would be useful to survey the area forward or aft of the tail, wingtips and/or engines, to detect obstructions with sufficient range and measurement resolution in a potential collision path, and to provide visual and audible alerts to the cockpit.

SUMMARY

In one example, a system comprises at least one light projector, at least one image sensor, and at least one controller. The at least one light projector is attachable to an aircraft at a first location. The at least one light projector is configured to emit a first beam of light in a first direction at a first intensity. The at least one image sensor is attachable to the aircraft at a second location. The at least one image sensor is configured to capture a first image of a scene including the reflections of first beam of light and a second image of the scene while the at least one projector is not emitting light. The at least one controller is configured to subtract pixel values of the second image from pixel values of the first image to provide a third image, to determine a light intensity of the first beam of light in the third image, and to determine a maximum detection range of the first beam of light based upon the light intensity, the first location, and the second location.

In one example, a method comprises emitting a first beam of light in a first direction at a first intensity using a light projector; capturing, using an image sensor, a first image of a scene including reflections of the first beam of light; capturing, using the image sensor, a second image of the scene while the light projector is not emitting light; subtracting, using a controller, pixel values of the second image from pixel values of the first image to provide a third image; determining, using the controller, a light intensity of the first beam of light in the third image; and determining, using the controller, a maximum detection range of the first beam of light based upon the light intensity, the first location, and the second location.

DETAILED DESCRIPTION

Apparatus, systems, and associated methods relate to range detection in aircraft visibility systems. In degraded visibility conditions, such as rain, fog, and/or snow, the maximum detection range and human sight visibility range of aircraft visibility systems are degraded. In addition, the human sight visibility range can be degraded by low ambient light levels. Using the apparatus, systems, and associated methods herein it can be determined when and at what range such aircraft visibility systems degrade below reliable use. Ground taxi operation safety is improved by validating the maximum detection range. It is also possible to be used to increase safety during airborne operations of approach and landing. The addition of built in test capability allows structured light to be used as a primary measurement system. Primary systems can be used to take the place of the pilot function. This reduces pilot workload and allows for taxi autonomy.

Figure 1:
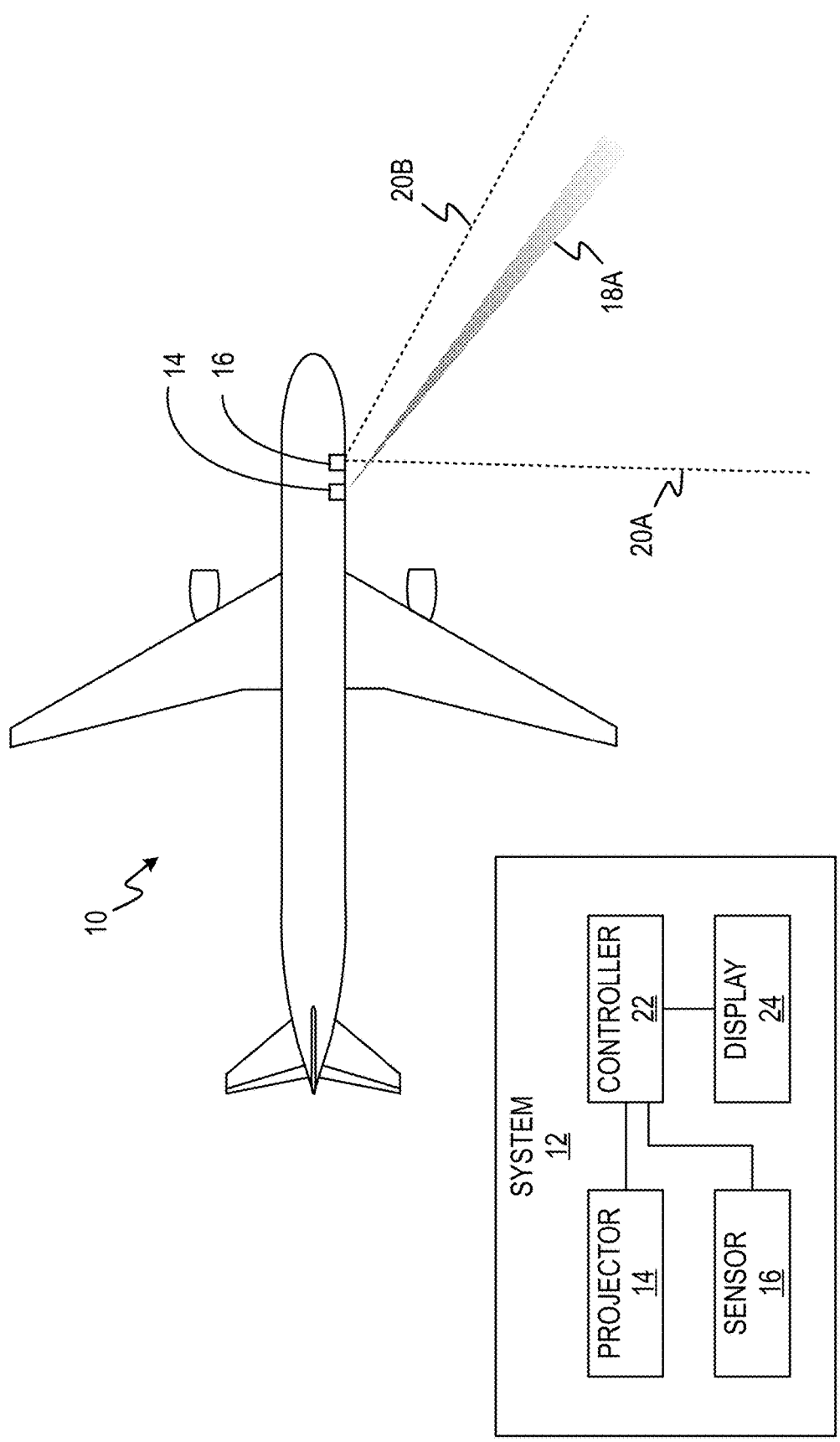
FIG. 1 shows an overhead view of an aircraft with a visibility range sensing system in a first configuration.

FIG. 1 shows an overhead view of an aircraft with a visibility range sensing system including aircraft 10, a block diagram of visibility range sensing system 12, light projector 14, image sensor 16, light beam 18A, and dotted lines 20A and 20B. Visibility range sensing system 12 includes projector 14, image sensor 16, controller 22, and display 24. Light projector 14 and image sensor 16 are mounted on aircraft 10. Light beam 18A is provided by light projector 14. Dotted lines 20A and 20B indicated the boundaries of the field of view of image sensor 16.

Light projector 14 and image sensor 16 are arranged, for example, on a side of aircraft 10. The relative locations of light projector 14 and image sensor 16 are known and calibrated. Image sensor 16 captures images of the visual scene within its field of view and converts the visual scene to pixel values. In some examples, image sensor 16 is a camera. Light projector 14 emits a light beam of controlled intensity, direction, divergence angle, and/or light pattern. Controller 22 performs image processing to compute difference images, converts image pixel coordinates to distances, determines light beam range based upon the light intensity of light beams, computes light gradient and extinction values, and determines the maximum detection range of visibility range sensing system 12. Controller 22 provides data for display on display 24. Display 24 can be a pilot display, flight controller display, and/or other aircraft displays. Display 24 provides information to a user based upon the data provided by controller 22. The information can include the maximum visible range, a recommended maximum taxi speed, the ambient light condition, the image sensor detection limits, and the current performance level of image sensor 16.

Light projector 14 provides light beam 18A to illuminate a portion of the scene within the field of view of image sensor 16. Light beam 18A can be turned on only during image capture or for longer lengths of time. Image sensor 16 captures an image of the scene with light beam 18A turned on. Image sensor also 16 captures an image of the same scene with light beam 18A turned off. Via image processing, the two captured images are subtracted from each other to remove background light sources. Extinction values are used to compute the maximum detection range. Images captured without a light beam from light projector 14 are used to determine the ambient light level. This ambient light measurement can be captured across the full visible spectrum. Light meters may also be used to provide the ambient light measurement. Using the ambient light levels and the extinction value, the maximum visible range can be computed. This information can be used to inform a pilot of the distance at which objects can be seen while taxiing in visually degraded environments such as rain, fog, snow, and/or low ambient lighting. This information can also be used by various vision based systems to ensure the validity of the images and data they capture.

With clear conditions and long-distance visibility ranges, images captured by image sensor 16 will not include a light beam, such as light beam 18A, that is visible throughout its length. When fog, rain, or snow is present, light beams provided by light projector 14 will be scattered by the particulates making the light beams visible throughout their length. As shown in FIG. 1, light beam 18A is visible throughout its length. Light beam 18A is shown such that the intensity of light reflecting from particulates is shown darker, and as light beam 18A fades over distance it is shown lighter. As light beam 18A fades, its intensity decreases and the light level of light beam 18A becomes closer to the background light level. Light projector 14 can increase or decrease the light intensity of light beam 18A. Light beam 18A fades due to the increased extinction value caused by conditions such as fog, rain, and/or snow. The range at which light beam 18A is no longer detected is the maximum detection range. The value of the maximum detection range of light beam 18A is determined by controller 22 using triangulation. Controller 22 uses the known or calibrated locations of light projector 14 and image sensor 16, the angle of projection of light beam 18A, and the measured pixel length of light beam 18A. Controller 22 applies a constant to the maximum detection range to determine a human sight visibility range. Based upon the maximum detection range and/or the human sight visibility range, a recommended taxi speed can also be determined. The human sight visibility range and the recommended taxi speed can be displayed to the pilot on display 24.

In some examples, the known location of light projector 14, the pattern of light beam 18A, and the output intensity of light beam 18A are used to determine the maximum detection range of light beam 18A. Light projector 14 may project light beam 18A as a single narrow beam, a line, or a wide beam. Light beam 18A starts with a small cross-sectional area near light projector 14 and increases in cross sectional area as it extends from light projector 14. In some examples, controller 22 uses the dimming gradient of light beam 18A to determine the extinction value. The dimming gradient is a measure of how fast light beam 18A dims with increased distance from light projector 14. Controller 22 determines the extinction value by scaling the dimming gradient.

Figure 2:
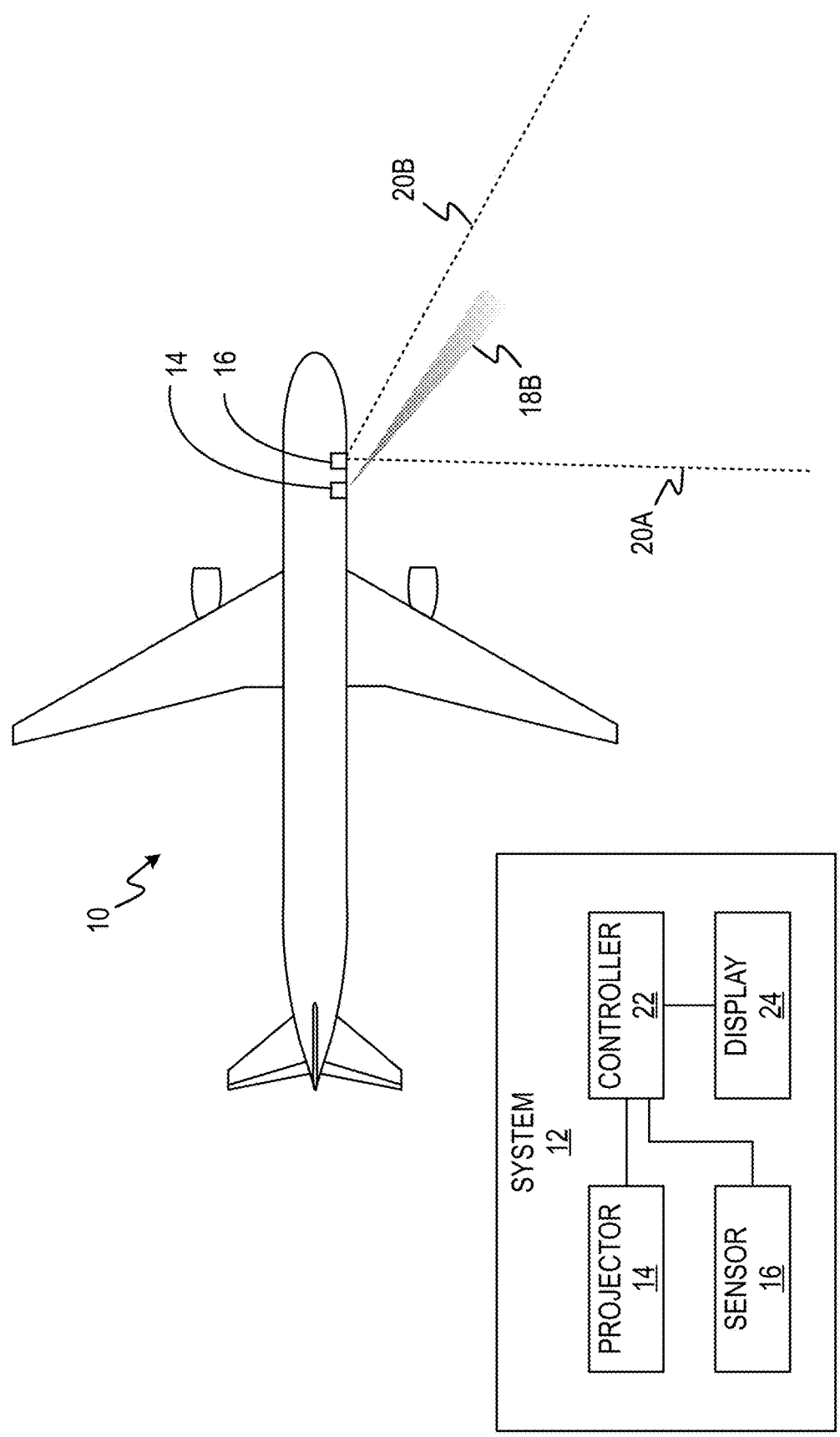
FIG. 2 shows an overhead view of an aircraft with a visibility range sensing system in a second configuration.

FIG. 2 shows an overhead view of an aircraft with a visibility range sensing system including aircraft 10, a block diagram of visibility range sensing system 12, light projector 14, image sensor 16, light beam 18B, and dotted lines 20A and 20B. Visibility range sensing system 12 includes projector 14, image sensor 16, controller 22, and display 24. Light projector 14 and image sensor 16 are mounted on aircraft 10. Light beam 18B is provided by light projector 14. Dotted lines 20A and 20B indicate the boundaries of the field of view of image sensor 16.

Light beam 18B has a lower intensity than light beam 18A of FIG. 1. With the lower intensity, light beam 18B fades at a shorter distance than light beam 18A. With the different light intensity of light beam 18B, light beam 18B has a different maximum detection range. Light beam 18B also has a different rate of change in light intensity. The extinction value between light beam 18A and 18B is unchanged because the degraded conditions cause light beams 18A and 18B to fade at the same rate. The maximum detection range of beam 18B is shorter, because light beam 18B is emitted from light projector 14 at a lower intensity than light beam 18A.

Figure 3:
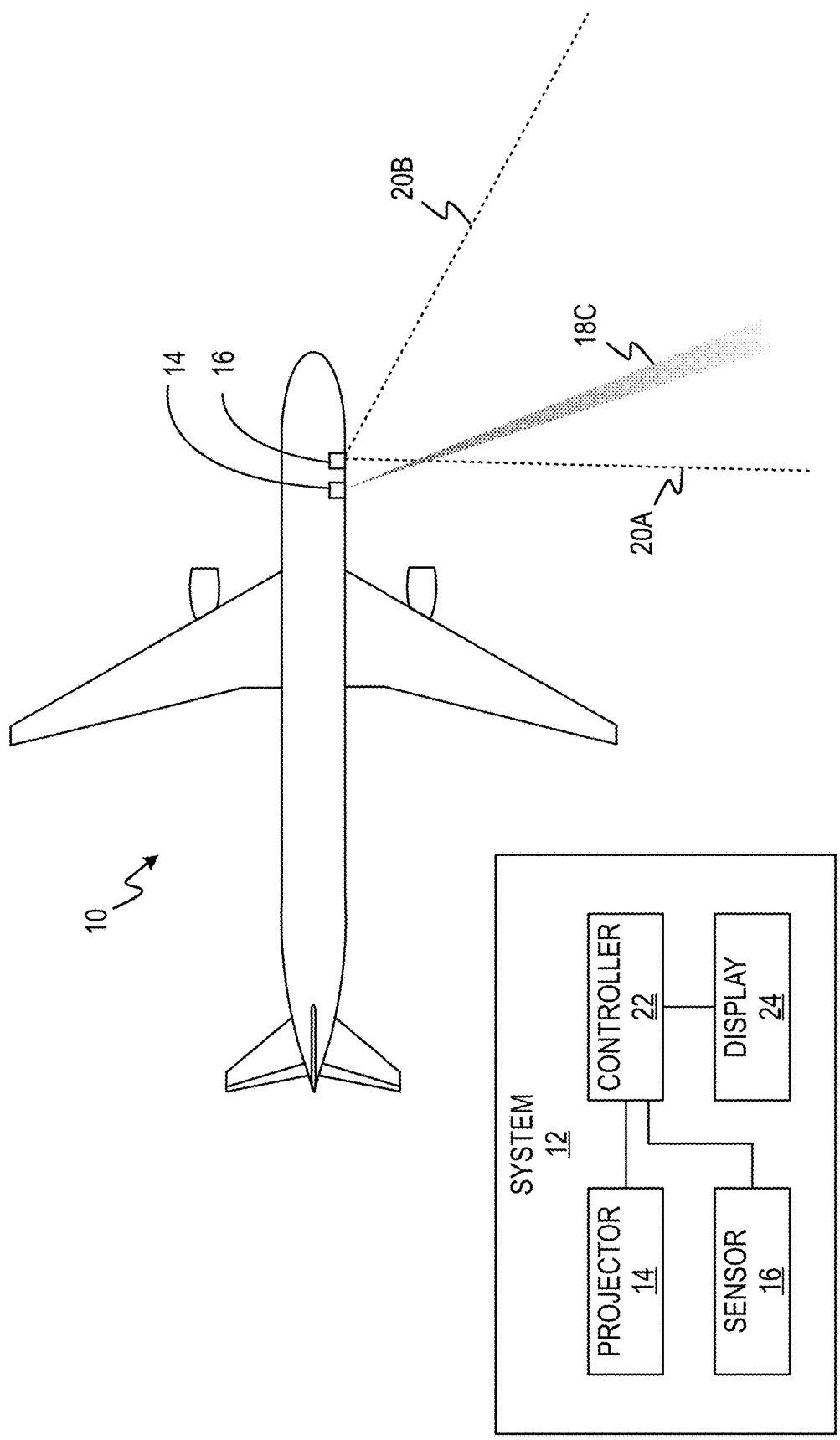
FIG. 3 shows an overhead view of an aircraft with a visibility range sensing system in a third configuration.

FIG. 3 shows an overhead view of an aircraft with a visibility range sensing system including aircraft 10, a block diagram of visibility range sensing system 12, light projector 14, image sensor 16, light beam 18C, and dotted lines 20A and 20B. Visibility range sensing system 12 includes projector 14, image sensor 16, controller 22, and display 24. Light projector 14 and image sensor 16 are mounted on aircraft 10. Light beam 18C is provided by light projector 14. Dotted lines 20A and 20B indicate the boundaries of the field of view of image sensor 16.

Light beam 18C has the same light intensity light beam 18A of FIG. 1, but light beam 18C is directed at a different angle than light beam 18A. Light beam 18A and 18C are emitted by light projector 14 at the same intensity in the same degraded conditions, therefore, light beam 18A and light beam 18C have the same maximum detection range value, but in different directions. In some examples, measurements are verified using two or more light beams of different intensities, such as light beam 18A and light beam 18B. Controller 22 determines the maximum detection range of light beams 18A and 18B to determine the dimming gradient of both light beams 18A and 18B. In other examples, measurements are verified using two light beams of the same intensity directed at different angles, such as light beam 18A and light beam 18C. Controller 22 determines the dimming gradient of light beam 18A and 18C to determine the maximum detection range of light beams 18A and 18C. Measuring the dimming gradient two or more times is equivalent to finding the maximum detection range because light beams 18A and 18C have the same maximum detection range value. Both measurements can be used to ensure they are consistent.

In some examples, light projector 14 emits light at two or more wavelengths. Projecting light at two or more wavelengths provides additional measures of visibility range. Longer IR wavelengths are capable of transmitting through longer ranges depending on the size of particles present in the air. This multispectral feature is used for determining visibility ranges at the different optical wavelengths. In some examples, light projector 14 uses short duration pulses that prevent personnel from seeing the light source emitted from the system. Short duration pulses can include pulses of 1 millisecond or less. In some examples, light projector 14 emits infrared light making the light invisible to personnel.

Figure 4:
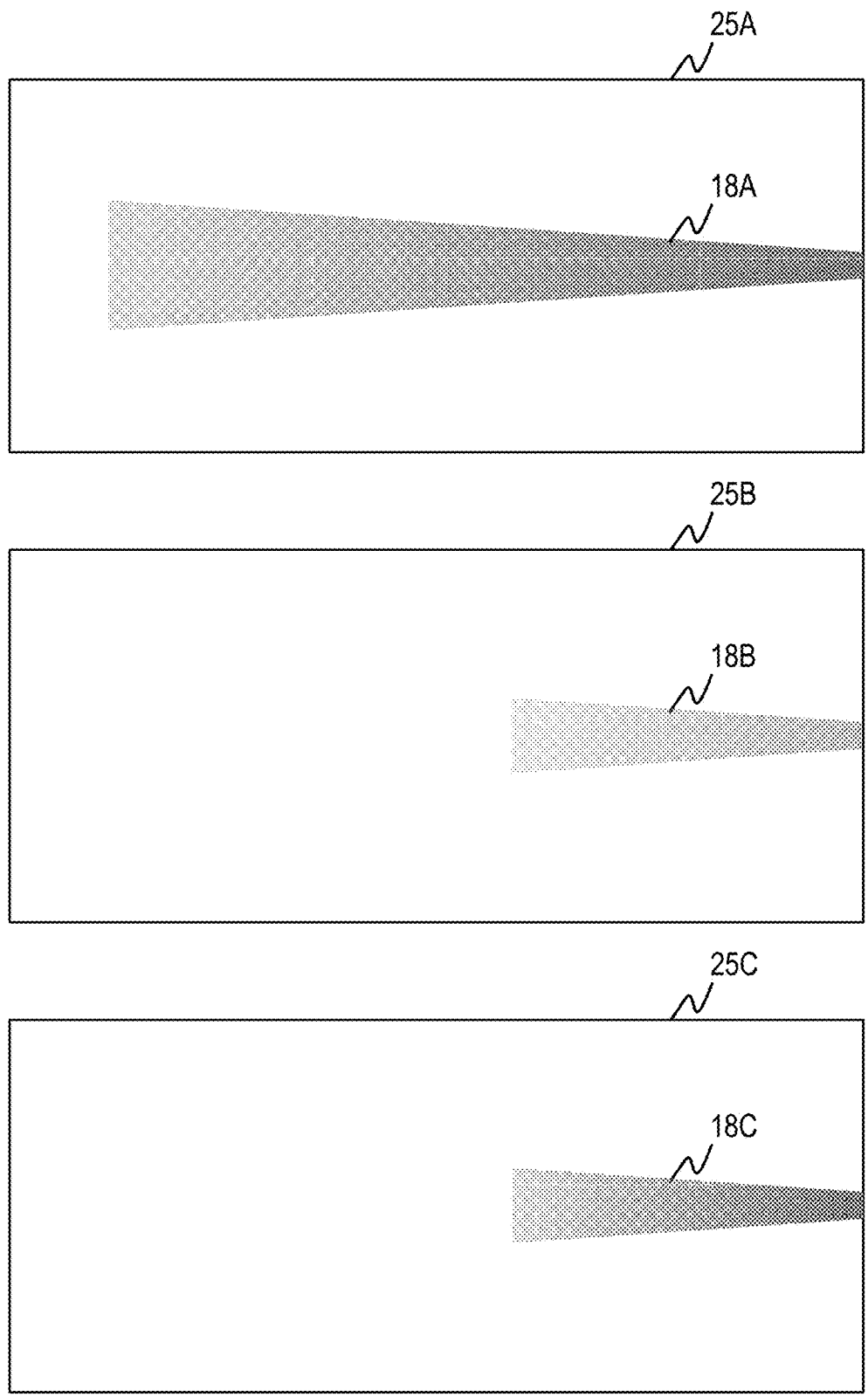
FIG. 4 is a set of three images captured by a visibility range sensing system in the first, second, and third configuration.

FIG. 4 illustrates images 25A-25C captured by image sensor 16 of light beams 18A-18C of FIGS. 1-3. Image 25A includes light beam 18A, image 25B includes light beam 18B, and image 25C includes light beam 18C. For purposes of clarity and ease of discussion, images 25A-25C will be discussed within the context of visibility range sensing system 12 of FIGS. 1-3.

Light beams 18A-18C start out bright on the right side near the light projector source and fade on the left side. At each point along the length of light beams 18A-18C, the light intensity has a different value as the light fades over distance. Each pixel in images 25A-25C has a light intensity value. The intensity of light beams 18A-18C are controlled at light projector 14. The rate of change in the light intensity of each of light beams 18A-18C is a direct measure of the light extinction value. The pixel coordinates of each pixel in images 25A-25C corresponds to a distance from aircraft 10 at a given angle. This allows controller 22 to determine the distance of each point along light beams 18A-18C from aircraft 10 in images 25A-25C based upon the pixel coordinates and angles of projection of light beams 18A-18C. With the determined distances and light intensity values the rate of change of light intensity can be determined.

With the different light intensity of light beam 18B compared to light beam 18A, light beam 18B has a different maximum detection range. Although light beam 18B is shorter, the rate of change of light intensity remains the same. The extinction value between light beam 18A and 18B also remains unchanged. Light beam 18B has a lower intensity at the right edge of image 25B than light beam 18A in image 25A. The lower intensity is due to the lower intensity of the projector output. Determining the rate of change in light intensity using light beam 18B in addition to light beam 18A is a way to verify the extinction value and maximum detection range of light beam 18A.

Image 25C depicts light beam 18C. Light beam 18C appears to have the same length as light beam 18B despite having the same maximum detection range as light beam 18A. This is because light beam 18C is projected at an angle that is more normal to the field of view of image sensor 16. This causes light beam 18C to take up less of the horizontal space of the field of view of image sensor 16 than light beam 18A while having the same maximum detection range as light beam 18A. Light beam 18C also has a nearly the same intensity, but is slightly lower at the right edge of image 25C than light beam 18A in image 25A. The initial intensity is slightly lower due to capturing the light beam on the right side of the image at a distance further from the projector. The shorter length of the light beam in image sensor 16 is caused by the different projection angle. Accordingly, light beam 18C fades out towards the center of the image because the pixels of image 25C represent a different range and a longer distance to light beam 18C than the pixels of image 25B to light beam 18B. The angles of light beams 18A-18C are known and the locations of light projector 14 and image sensor 16 are known allowing triangulation to be used to determine distances in each of images 25A-25C. This allows visibility range sensing system 12 to determine the maximum detection range regardless of the angle and intensity of light beams provided by light projector 14.

Figure 5A:
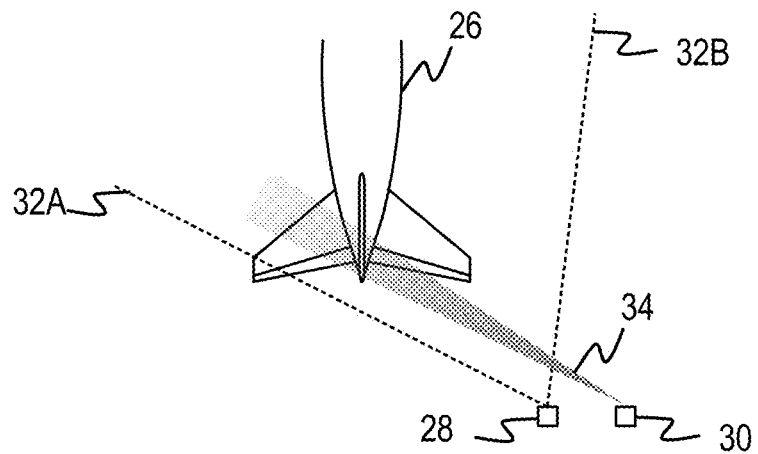
FIG. 5A shows an overhead view of an aircraft tail in the field of view of a visibility range sensing system.

FIG. 5A shows an overhead view of an aircraft tail in the field of view of a visibility range sensing system including aircraft tail 26, image sensor 28, light projector 30, dotted lines 32A and 32B, and light beam 34.

Light projector 30 emits light beam 34 onto aircraft tail 26. Light beam 34 is projected as a narrow vertical line. Image sensor 28 captures images of the scene within the field of view bounded by dotted lines 32A and 32B. Under clear air conditions, when light beam 34 hits an object within the field of view of image sensor 28, such as aircraft tail 26, light beam 34 appears as a narrow line on the object. Under degraded visibility conditions, light beam 34 spreads more than the divergence angle in clear conditions causing the narrow line to become wider than normal with distance. The degraded visibility conditions cause light beam 34 to appear wider than normal on objects within the field of view of image sensor 28. The divergence in light beam 34 occurs both in the transmission from light projector 30 and from the reflection of light beam 34 from aircraft tail 26 to image sensor 28. Image sensor 28 captures the total divergence of light beam 34 to aircraft tail 26 and back to image sensor 28.

Figure 5B:
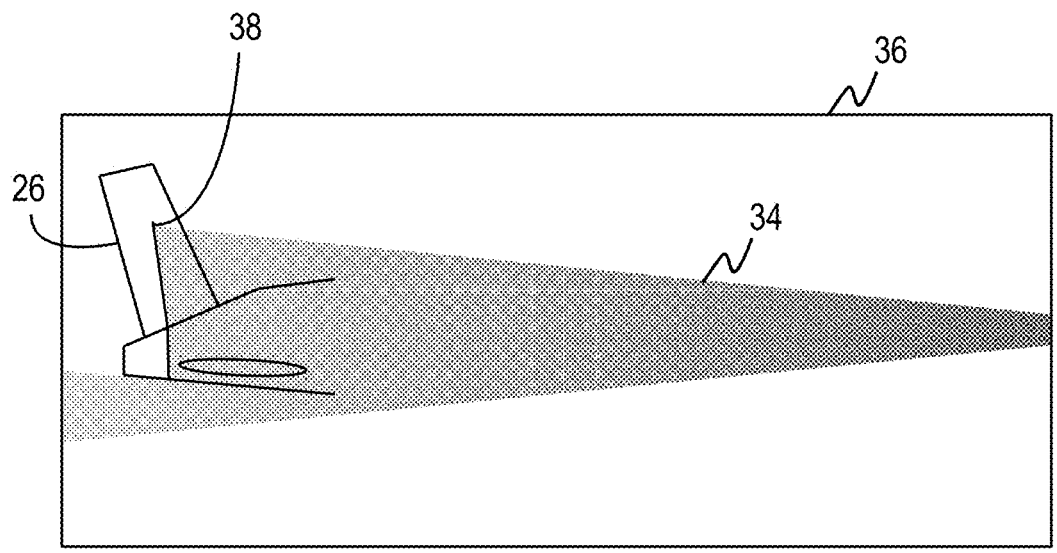
FIG. 5B shows an image captured by a visibility range sensing system.

FIG. 5B shows image 36 captured by image sensor 28 of FIG. 5A including aircraft tail 26, light beam 34, and vertical light line 38.

In image 36 captured by image sensor 28, the range of light beam 34 is dependent on aircraft tail 26. Since light beam 34 appears as a line on aircraft tail 26 in image 36, the pixel coordinates and projection angle of light beam 34 can be used to determine the distance of aircraft tail 26 and the maximum detection range of light beam 34. Under degraded visibility conditions, vertical light line 38 will be wider, covering more pixels. Covering more pixels decreases the accuracy of the range determination because there is a wider distance that vertical light line 38 is associated with based upon pixel coordinates. The decrease in range accuracy can be mitigated by using a degraded range distance measurement. Using a degraded range distance measurement includes estimating what the width would be under clear conditions at aircraft tail 26. Determining the size of the wider than normal line allows for a determination of the extinction value and maximum detection range, independent of the light gradient.

Figure 5C:
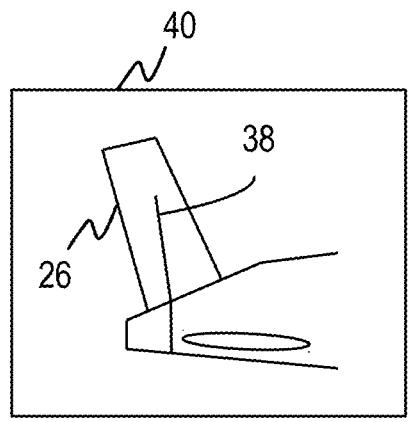
FIG. 5C shows a partial image captured by a visibility range sensing system in clear conditions.

FIG. 5C shows partial image 40 captured in clear conditions by the visibility range sensing system of FIG. 5A including aircraft tail 26 and vertical light line 38 under clear conditions.

Partial image 40 shows light beam 34 falling on aircraft tail 26 as vertical light line 38 under clear conditions.

Figure 5D:
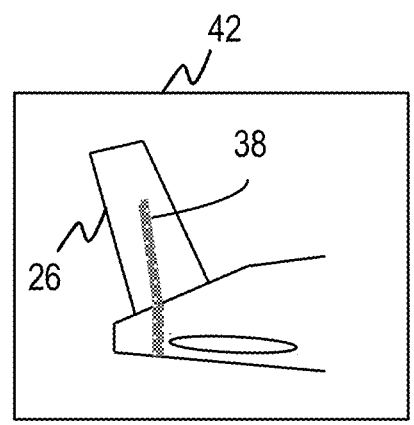
FIG. 5D shows a partial image captured by a visibility range sensing system in degraded conditions.

FIG. 5D shows partial image 42 captured in degraded visibility conditions by the visibility range sensing system of FIG. 5A including aircraft tail 26 and vertical light line 38 under degraded conditions.

Partial image 42 shows light beam 34 falling on aircraft tail 26 as vertical light line 38 under degraded visibility conditions.

Accordingly, apparatus, systems, and associated methods herein, allow aircraft visibility systems to accurately determine their maximum detection range and the human sight visibility range in degraded conditions such as rain, fog, and/or snow. Utilizing the visibility range sensing system described herein provides improved aircraft safety during taxiing, approach, and/or landing. Aircraft pilots are additionally provided with accurate information about the human sight visibility range and recommended speeds during degraded conditions.

Discussion of Possible Embodiments

The following are non-exclusive descriptions of possible embodiments of the present invention.

A system can comprise at least one light projector attachable to an aircraft at a first location, the at least one light projector configured to emit a first light beam in a first direction at a first intensity; at least one image sensor attachable to the aircraft at a second location, the at least one image sensor configured to capture a first image of a scene including the first light beam and a second image of the scene while the at least one light projector is not emitting light; and at least one controller configured to subtract pixel values of the second image from pixel values of the first image to provide a third image, to determine a light intensity of the first light beam in the third image, and to determine a maximum detection range of the first light beam based upon the light intensity, the first location, and the second location.

The system of the preceding paragraph can optionally include, additionally and/or alternatively, any one or more of the following features, configurations and/or additional components:

The at least one controller can be further configured to determine a human sight visibility range based upon the maximum detection range; and determine a suggested maximum taxi speed based upon the human sight visibility range.

The system of claim 2, further comprising a display configured to display the human sight visibility range and the suggested maximum taxi speed.

The at least one controller can be further configured to determine an extinction value of the first light beam based upon the light intensity of the first light beam; determine an ambient light level using the second image; and further determine the maximum detection range of the first light beam based upon the extinction value and the ambient light.

The at least one controller can be further configured to determine a dimming gradient of the first light beam using the third image; determine an extinction value of the first light beam using the dimming gradient; and further determine the maximum detection range of the first light beam based upon the extinction value.

The at least one light projector can be further configured to emit a second light beam in the first direction at a second intensity; the at least one image sensor can be further configured to capture a fourth image of the scene including the second light beam; and the at least one controller can be further configured to subtract pixel values of the second image from pixel values of the fourth image to provide a fifth image, to determine a light intensity of the second light beam in the fifth image, and to verify the extinction value based upon the light intensity of the second light beam.

The at least one light projector can be further configured to emit a second light beam in a second direction at the first intensity; the at least one image sensor can be further configured to capture a fourth image of the scene including the second light beam; and the at least one controller can be further configured to subtract pixel values of the second image from pixel values of the fourth image to provide a fifth image, to determine a light intensity of the second light beam in the fifth image, and to verify the extinction value based upon the light intensity of the second light beam.

Determining the maximum detection range can further include determining a width of the first light beam projected onto an object in the scene and comparing it to an expected width.

Determining the maximum detection range can further include using pixel coordinates of the first light beam in the third image.

The first light beam can be infrared light.

A method can comprise emitting a first light beam in a first direction at a first intensity using a light projector; capturing, using an image sensor, a first image of a scene including the first light beam; capturing, using the image sensor, a second image of the scene while the light projector is not emitting light; subtracting, using a controller, pixel values of the second image from pixel values of the first image to provide a third image; determining, using the controller, a light intensity of the first light beam in the third image; and determining, using the controller, a maximum detection range of the first light beam based upon the light intensity, the first location, and the second location.

The method of the preceding paragraph can optionally include, additionally and/or alternatively, any one or more of the following features, configurations and/or additional components:

Determining, using a controller, a human sight visibility range can be based upon the maximum detection range; and determining, using a controller, a suggested maximum taxi speed can be based upon the human sight visibility range.

Displaying, using a display, the human sight visibility range and the suggested maximum taxi speed.

Determining, using the controller, an extinction value of the first light beam can be based upon the light intensity of the first light beam; determining, using the controller, an ambient light level using the second image; and further determining, using the controller, the maximum detection range of the first light beam based upon the extinction value and the ambient light.

Determining, using the controller, a dimming gradient of the first light beam using the third image; determining, using the controller, an extinction value of the first light beam using the dimming gradient; and further determining, using the controller, the maximum detection range of the first light beam based upon the extinction value.

Emitting, using the light projector, a second light beam in the first direction at a second intensity; capturing, using the image sensor, a fourth image of the scene including the second light beam; subtracting, using the controller, pixel values of the second image from pixel values of the fourth image to provide a fifth image; determining, using the controller, a light intensity of the second light beam in the fifth image; and verifying, using the controller, the extinction value based upon the light intensity of the second light beam.

Emitting, using the projector, a second light beam in a second direction at the first intensity; capturing, using the image sensor, a fourth image of the scene including the second light beam; subtracting, using the controller, pixel values of the second image from pixel values of the fourth image to provide a fifth image; determining, using the controller, a light intensity of the second light beam in the fifth image; and verifying, using the controller, the extinction value based upon the light intensity of the second light beam.

Determining the maximum detection range can further include determining a width of the first light beam projected onto an object in the scene and comparing it to an expected width.

Determining the maximum detection range can further include using pixel coordinates of the first light beam in the third image.

The first light beam can be infrared light.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   at least one light projector attachable to an aircraft at a first location, the at least one light projector configured to emit a first light beam in a first direction at a first intensity;
   at least one image sensor attachable to the aircraft at a second location, the at least one image sensor configured to capture a first image of a scene including reflections of the first light beam and a second image of the scene while the at least one light projector is not emitting light; and
   at least one controller configured to subtract pixel values of the second image from pixel values of the first image to provide a third image, to determine a light intensity of the first light beam in the third image, to determine a dimming gradient of the first light beam using the third image, to determine an extinction value of the first light beam using the dimming gradient and the first and second locations, and to determine a maximum detection range of the first light beam based upon the extinction value.

2. The system of claim 1, wherein the at least one controller is further configured to:
   determine a human sight visibility range based upon the maximum detection range; and
   determine a suggested maximum taxi speed based upon the human sight visibility range.

3. The system of claim 2, further comprising a display configured to display the human sight visibility range and the suggested maximum taxi speed.

4. The system of claim 1, wherein the at least one controller is further configured to:
   determine an ambient light level using the second image; and
   determine the maximum detection range of the first light beam further based upon the ambient light.

5. The system of claim 1, wherein:
   the at least one light projector is further configured to emit a second light beam in the first direction at a second intensity;
   the at least one image sensor is further configured to capture a fourth image of the scene including reflections of the second light beam; and
   the at least one controller is further configured to subtract pixel values of the second image from pixel values of the fourth image to provide a fifth image, to determine a light intensity of the second light beam in the fifth image, and to verify the extinction value based upon the light intensity of the second light beam.

6. The system of claim 1, wherein:
   the at least one light projector is further configured to emit a second light beam in a second direction at the first intensity;
   the at least one image sensor is further configured to capture a fourth image of the scene including reflections of the second light beam; and
   the at least one controller is further configured to subtract pixel values of the second image from pixel values of the fourth image to provide a fifth image, to determine a light intensity of the of the second light beam in the fifth image, and to verify the extinction value based upon the light intensity of the second light beam.

7. The system of claim 1, wherein determining the maximum detection range further includes determining a width of the first light beam projected onto an object in the scene and comparing it to an expected width.

8. The system of claim 1, wherein determining the maximum detection range further includes using pixel coordinates of the first light beam in the third image.

9. The system of claim 1, wherein the first light beam is infrared light.

10. A method comprising:
    emitting a first light beam in a first direction at a first intensity using a light projector mounted at a first location on an aircraft;
    capturing, using an image sensor mounted at a second location on an aircraft, a first image of a scene including reflections of the first light beam;
    capturing, using the image sensor, a second image of the scene while the light projector is not emitting light;
    subtracting, using a controller, pixel values of the second image from pixel values of the first image to provide a third image;
    determining, using the controller, a light intensity of the first light beam in the third image;
    determining, using the controller, a dimming gradient of the first light beam using the third image; and
    determining, using the controller, an extinction value of the first light beam using the dimming gradient and the first and second locations; and
    determining, using the controller, a maximum detection range of the first light beam based upon the extinction value.

11. The method of claim 10, further comprising:
    determining, using a controller, a human sight visibility range based upon the maximum detection range; and
    determining, using a controller, a suggested maximum taxi speed based upon the human sight visibility range.

12. The method of claim 11, further comprising displaying, using a display, the human sight visibility range and the suggested maximum taxi speed.

13. The method of claim 10, further comprising:
    determining, using the controller, an ambient light level using the second image; and
    determining, using the controller, the maximum detection range of the first light beam further based upon the ambient light.

14. The method of claim 10, further comprising:
    emitting, using the light projector, a second light beam in the first direction at a second intensity;
    capturing, using the image sensor, a fourth image of the scene including reflections of the second light beam;
    subtracting, using the controller, pixel values of the second image from pixel values of the fourth image to provide a fifth image;
    determining, using the controller, a light intensity of the second light beam in the fifth image; and
    verifying, using the controller, the extinction value based upon the light intensity of the second light beam.

15. The method of claim 10, further comprising:
    emitting, using the projector, a second light beam in a second direction at the first intensity;
    capturing, using the image sensor, a fourth image of the scene including reflections of the second light beam;
    subtracting, using the controller, pixel values of the second image from pixel values of the fourth image to provide a fifth image;
    determining, using the controller, a light intensity of the second light beam in the fifth image; and
    verifying, using the controller, the extinction value based upon the light intensity of the second light beam.

16. The method of claim 10, wherein determining the maximum detection range further includes determining a width of the first light beam projected onto an object in the scene and comparing it to an expected width.

17. The method of claim 10, wherein determining the maximum detection range further includes using pixel coordinates of the first light beam in the third image.

18. The method of claim 10, wherein the first light beam is infrared light.

* * * * *